United States Patent Office 3,572,203
Patented Mar. 23, 1971

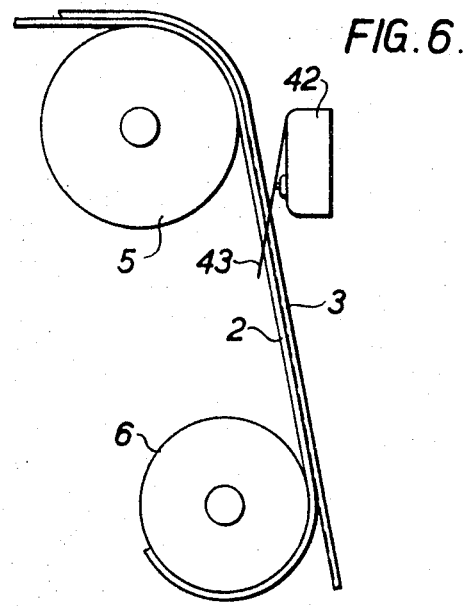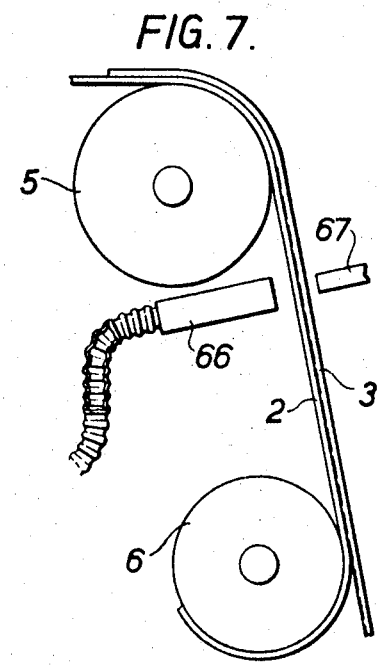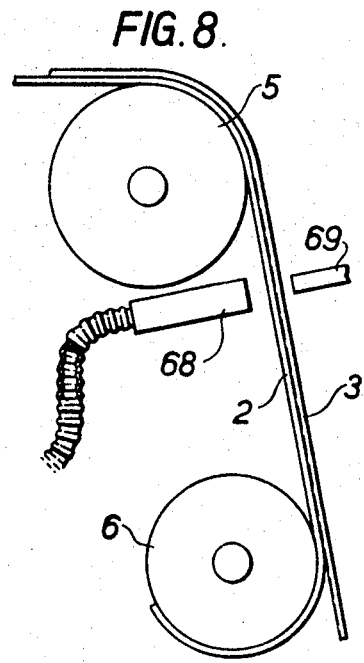

3,572,203
COPYING MACHINE AND FEED APPARATUS
THEREFOR
Edward Woodham, West Mersea, and Edward Charles
Richard Scoffin, Colchester, England, assignors to E. N.
Mason & Sons Limited, Colchester, England
Filed July 19, 1968, Ser. No. 746,067
Claims priority, application Great Britain, July 19, 1967,
33,259/67
Int. Cl. B65h 35/06
U.S. Cl. 83—155                                23 Claims

ABSTRACT OF THE DISCLOSURE

An apparatus for feeding an original and material to receive a copy thereof to copying means, comprising a severing device operative to cut off a length of the copy material determined by the length of the original. Trip mechanism may be provided operatable by the original to initiate the drive of the copy material; to stop the feed of such material and to set the severing device in operation, and a reservoir loop of copy material may be formed on the delivery side of the severing device or a loop of both original and copy material. The severing device preferably comprises a knife which has initial penetrating points and cutting edges which have a progressive action and has a spring produced cutting stroke.

---

Figure 1:
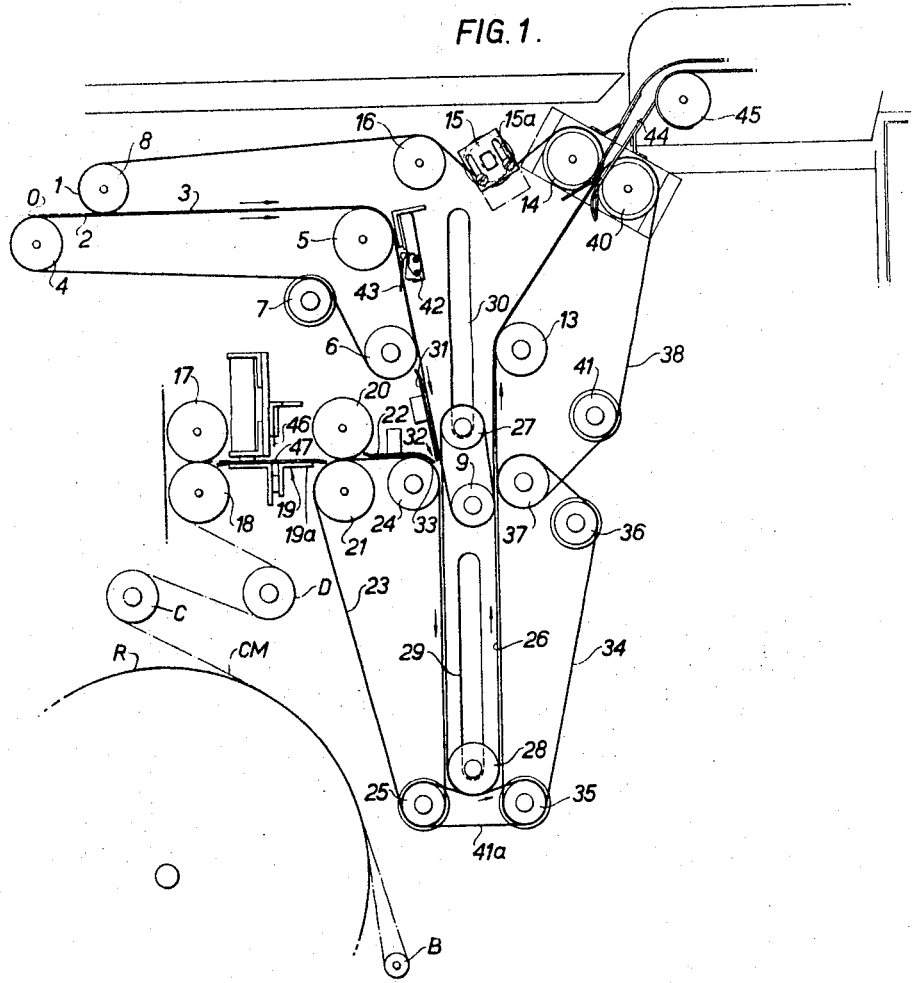

The present invention relates to photo or other copying machines and more particularly to apparatus for feeding the original and the paper or other material to receive the copy (hereinafter called "copy material") to such a machine or to such apparatus when embodied in such a machine for feeding the original and the copy material to the copying zone.

The main object of the present invention is mechanically to feed from a supply, such as a roll, to the copying machine, or the copying section thereof, pieces of copy material mechanically severed to a size determined by the size of the original.

To this end, apparatus according to the invention comprises means for feeding an original and means for feeding copy material from a supply, a severing device for cutting off a section of the copy material for delivery with the original, said severing device being operative to cut off a length of the copy material determined by the length of the original.

Trip mechanism may be provided operatable by the original fed into the apparatus and releasable by the trailing end of the original to cause actuation of the severing device, e.g., the descent of a cutter knife. The trip mechanism may be of any suitable kind.

The original may be fed continuously in an appropriate path through the apparatus by suitable belt-conveying means and the copy material may be fed from a roll by feed rollers over a table or platform designed to permit the cutter knife to sever the material supported thereon, and thence by way of belt conveyor means to a position where the original and severed copy material are brought together for conveyance by further belt-conveying means to the copying machine or to the copying section of the machine.

Such apparatus may be designed so that the path of the original from the trip mechanism to the region where the leading ends of the original and the copy material come together is equal to the path for the copy material from the cutter to the said region and the timing of the cut is made dependent upon the length of the particular original.

The apparatus may comprise means responsive of the release of the trip mechanism for stopping the copy material at the severing zone for the cut.

After any copying operation, the leading end of the copy material will be at the cutting point and stationary. It will be set in motion at the requisite speed when the trip mechanism is operated by the leading edge of the inserted original and it will be cut off from the supply to form a severed length which substantially corresponds to the length of the original when the trailing end of the original releases the trip mechanism.

Means may be provided to form a loop of the copy material on the delivery side of the severing means while the leading end portions of the original and the copying material are travelling so that the said material loop may be shortened while the material at the cutting zone is stopped and severed.

To this end, the material may pass from the table or platform through the nip of a pair of intermediate rollers arranged between the cutter and the said region, and thence under a guide roller, the material being looped to pass under the said roller which is displaceable by the tension on the material e.g., in a slot, so that the length of the loop can vary.

The said intermediate rollers may be continuously rotated, and when the infeed of the copy material ceases, these rollers tend still to feed it, and thus the material across the severing zone may be tautened. When the material has been tautened, the intermediate rollers can slip on the material.

The cutting action is practically instantaneous, but nevertheless the copy material between the intermediate rollers and the cutter can be stopped while the original is being continuously fed and the copy material is also travelling from the said region, the aforesaid loop providing a kind of reservoir of copy material from which the copy material can be drawn while the copy material between the cutter and the intermediate rollers is held.

The trip mechanism may be operated by the leading edge of the original to initiate the feed of the copy material from the supply roll, e.g., such mechanism may be operated by the leading end of the original to control switch means to couple a motor which may be the motor which drives the several belts, to drive means for feeding the copy material from the supply to the severing means, the leading edge of the copy material then being at the severing zone. The trip mechanism when operated by the leading edge of the original may cause the engagement of a clutch which couples the feed means for the copy material to the driving motor. The trip mechanism may include a microswitch and a flexible or pivoted finger which is displaceable by the leading edge of the original to operate the microswitch and control the engagement of an electromagnetic clutch through which feed drive is transmitted by said motor. The microswitch may also operate means to open a circuit controlling a brake, e.g., an electromagnetic brake, so that when the clutch is engaged the brake will be released.

The trip mechanism may be constructed and arranged so that when released by the trailing edge of the original, it will stop the feed of copy material from the supply roll. Thus the said clutch may be disengaged when the trailing end of the paper releases the trip mechanism and the brake be brought into effect.

A rapid action of the knife may be derived from the trip mechanism in any suitable way. The cutter knife may be motor-operated, e.g., an electrical pulse may be derived from the microswitch to which the electric motor is responsive. The pulse producing device may be a lever-operated, selenium or infra-red cell controlled device, but any suitable means for initiating the operation of the cutter knife in dependence upon the length and position in travel of the original will serve. Return of the cutter by the action of the cutter motor or otherwise may be utilised to reset the trip mechanism and to cut-out the said motor when the cutter returns to a predetermined position.

Preferably however the cutter knife is operable for severing the copy material by spring means, the spring means being energised and the knife retained in an inoperative position until the trip means are released by the trailing end of the original and actuate means whereby the knife is freed for movement by the action of the spring means to sever the copy material.

The knife may be held in inoperative position by a rack bar which is retained by a latch or like mechanism releasable when the trip means are released by the trailing end of the original, the rack bar then releasing the knife for displacement by the spring means for producing a rapid descent of the knife to sever the material.

The trip mechanism comprising the said finger and microswitch may cause an electrical pulse to be transmitting to a solenoid or like means for releasing the latch or like mechanism when the trailing end of the original releases the trip means.

The said rack bar may control a switch in a motor circuit so that when the bar is retaining the knife inoperative, the motor is cut-out, the motor serving to operate a gear sector which is co-operative with the rack of the bar so that only when the bar is released and displaced to permit the knife to operate, will the sector be turned eventually to engage the rack and displace the bar in the reverse direction to re-energise the spring until the bar again operates the switch and shuts off the motor, the engagement with the gear sector with the rack only occurring after the sector has rotated sufficiently, say through 270°, and the bar has completed its release movement, e.g., a movement lengthwise vertically upwards.

The knife advantageously is formed with a scalloped edge forming a series of spaced sharp points and intervening concave cutting edges so that the points first pierce the copy material and the said cutting edges between the points, and extending therefrom, then progressively cut the material. The knife may advantageously move in an arcuate path in its plane.

The original and the copy material may come together after a loop of copy material has been formed, but it is preferred that the original and copy material are brought together into juxtaposition and travel together as the loop.

A preferred form of apparatus comprises two endless belts for conveying the original between adjacent reaches thereof; means including an endless belt for conveying the copy material on the delivery side of the severing means; trip mechanism including as previously described a switch operable by a finger; the finger intersecting said reaches and intruding into the path of the original between them and arranged to be turned by the leading end of the original to set in motion the feed of the supply of the copy material, the finger when released by the trailing end of the original initiating the stopping of the copy material and the displacement of the severing means for the cut.

The length of the switch-operating finger aforesaid depends upon the speed of travel of the original and will generally be longer the slower the travel of the copy paper. Two or more such fingers may be provided and any one selected for operation according to the speed selected. A rheostat control of the drive motor may be provided for speed control.

Figure 2:
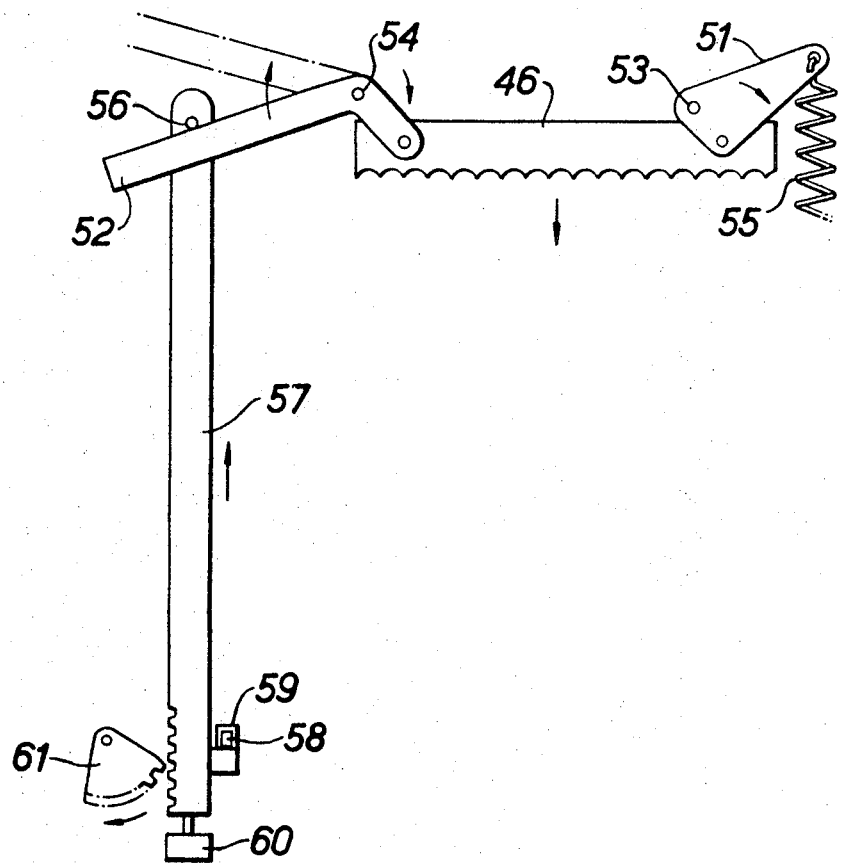
Figure 3:
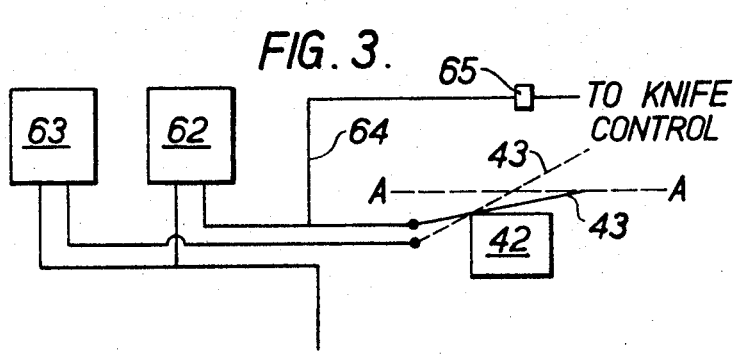
Figure 4:
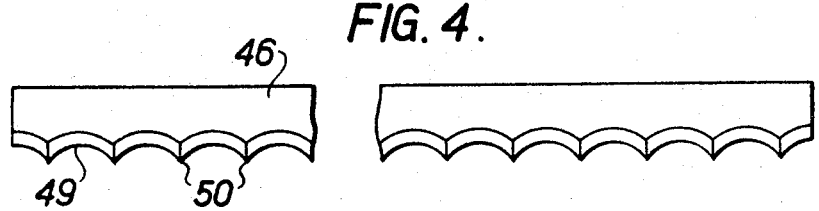
Figure 5:
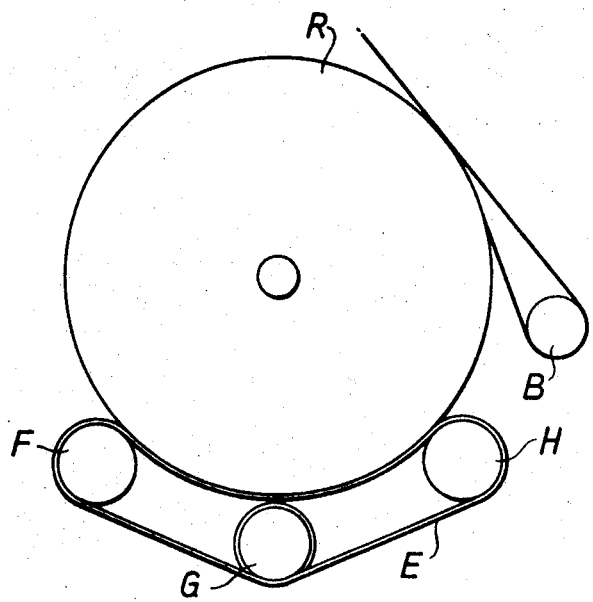
Figure 9:
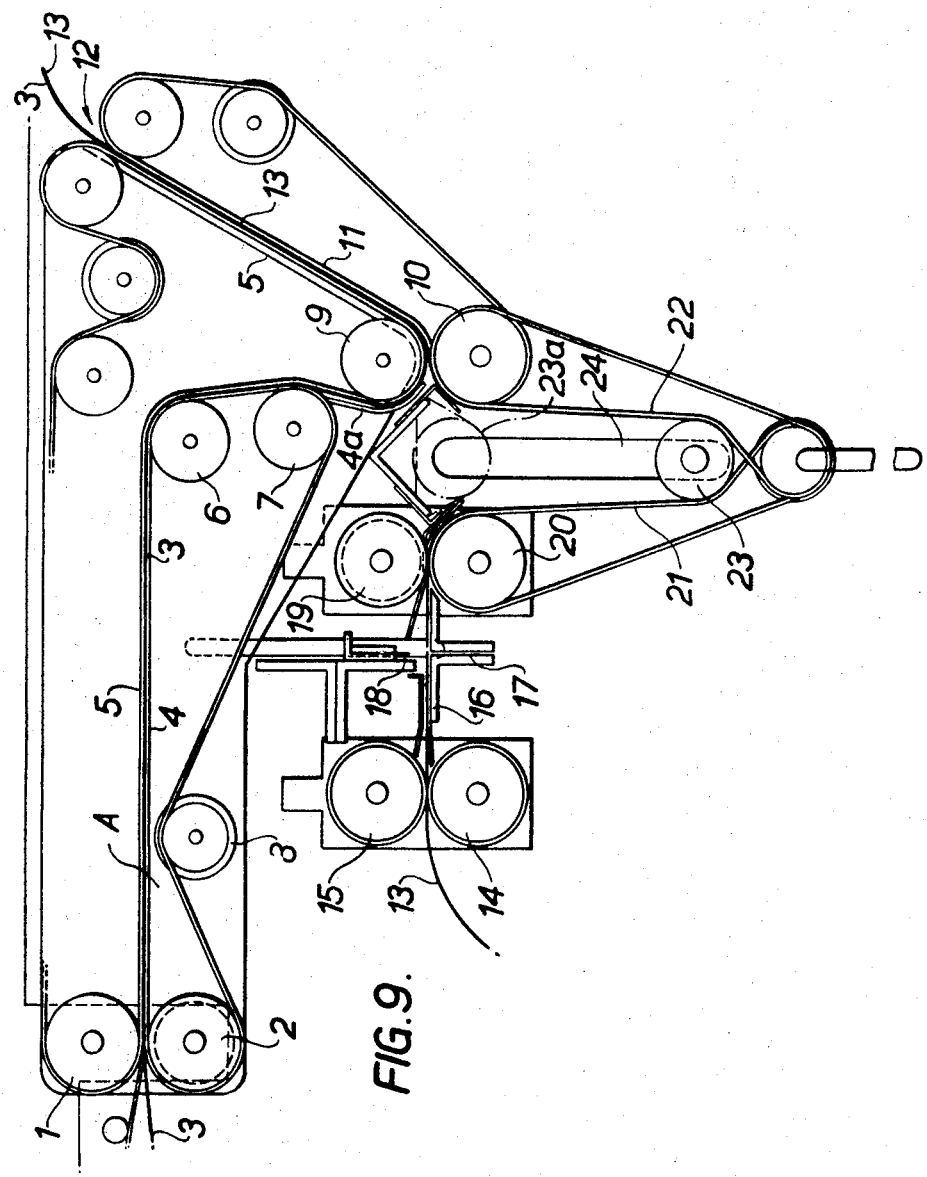

In the accompanying drawings, FIG. 1 is a side elevation of one embodiment of apparatus according to the invention; FIG. 2 is a diagrammatic illustration of the cutter mechanism; FIG. 3 is a diagrammatic illustration of a clutch control for supply rollers for the copying material and FIG. 4 is a view of a preferred cutter knife and FIG. 5 is a detail view, FIG. 6 shows a fragment of FIG. 1 on a larger scale. FIGS. 7 and 8 show modified trip mechanism. FIG. 9 is a side elevation of another embodiment of the invention.

The original to be copied is fed in the nip 1 between endless belts 2 and 3 which may each comprise multiple spaced narrow bands of flexible material (as may the further belts 23, 26, 34, 38 and 41a later referred to). Belt 2 passes over the internal rollers 4, 5 and 6 and over an external tensioning roller 7 which may be adjustable.

Belt 3 passes round internal roller 8, externally over roller 6, under roller 9, and upwards past external roller 13 round roller 14, under tensioning roller 15, which is provided with tension adjusting means 15a and over internal roller 16.

The copying material is fed from a roll R under a roll B and round rollers C and D and thence between rollers 17 and 18 past cutting device 19 over a platform 19a and between continuously rotating rollers 20, 21 behind which is a retaining plate 22 and a belt 23 which passes over the internal roller 21 aforesaid and over rolls 24 and 25. A belt E running over a triangular arrangement of rollers F, G, H, presses on the roll as this diminishes in diameter, see FIG. 5. The copy material is fed under the plate over roller 24 between belt 23 and a belt 26 which passes over an upper roller 27 and a lower roller 28, these rollers 27 and 28 being journalled in end bars to form a frame which can rise and fall, the journals of these rollers being arranged in vertical slots 30 and 29.

A retaining plate 31 leads to a junction point 32 at which the curved end 33 of the retaining plate 22 terminate. A further belt 34 passes round internal rollers 35, 36 and 37 yet another belt 38 passes under internal roller 37 past internal roller 13 round internal roller 40 and past internal roller 41. A still further belt 41a bears on roller 28 and travels round rollers 25 and 35.

A trip mechanism is provided which is actuatable by the leading end of the original and is released by the trailing edge. This mechanism comprises a microswitch 42 controlled by a finger 43 which lies across the adjacent reaches of the belts 2 and 3 between the rollers 5 and 6, the finger being arranged in a space between bands of the respective belts.

A feed guide 44 leads to the copying machine and passes over roller 45.

The cutting device see also FIGS. 2 and 4 comprises a knife 46 which descends through a narrow slot 47 in the platform 19a (FIG. 1). The construction of the knife is shown in FIG. 4. It has a scalloped cutting edge bevelled to form concave cutting edges 49 which meet at sharp points 50.

The knife see FIG. 2 is pivotally carried by levers 51 and 52 fulcrumed at 53 and 54 respectively. A powerful coil spring 55 normally tends to pull the lever 51 in the clockwise direction, and through the knife, to turn the lever 52 in the same direction. The lever 52 is however prevented from turning and the knife is kept in the raised position. This is achieved by providing a stop 56 on a vertically slidable rack bar 57 which is normally prevented from rising by a latch 58 which is lightly spring-loaded but can be released by the action of a solenoid 59. In the position shown the bottom of the rack bar is opening a switch 60 which controls the drive of an electric motor which drives a gear sector 61 which may be on or geared to the motor shaft. When the rack bar is in its lower switch-opening position, the gear sector is out of engagement with the rack. The motor, when switched on, drives the gear sector in a clockwise direction.

In FIG. 3, the line of speed of travel of the original is indicated at A—A. The microswitch finger 43 intersects this line until it is turned by the leading edge of the original. When thus turned the finger operates the microswitch 42 which causes engagement of a clutch 62 which controls the feed of the copy material, and the release of a brake 63. When the trailing edge of the original releases the finger the clutch is disengaged and the brake becomes operative. A line 64 can be taken from the brake circuit to the knife control through a delay unit 65 which ensures that the knife will not be released for cutting until the brake has become effective and stopped the copy material.

In operation, the original O will be fed into the nip 1, and the copy material CM will be drawn off the roll R passing under the roll B and round rolls C and D to the feed rolls 17 and 18.

The original O travels between belts 2 and 3 over rolls 5 and 6 and thence between belt 3 and guide plate 31 to the junction point 32.

The copy material travels from rolls 17, 18 past cutter device 19, between rolls 20 and 21 and thence between guide plate 22 and belt 23 to the said junction point 32.

It may be assumed, that following the last delivery, the leading edge of the copy material will coincide with the line of the cutter. The clutch 62 will then be disengaging the feed and the brake 63 will be holding the feed inoperative.

The cutter knife is held stationary in its raised position by the rack bar which is now in its lower position where it is held by the latch 58. The sector 61 is in the position shown in FIG. 2.

The original is now inserted between the adjacent reaches of the belts 2 and 3 and its leading edge operates the finger 43 to actuate the microswitch. The clutch is then engaged and the brake released. The feed of the copy material then commences and the material is fed by rollers 17, 18 over the platform 19a. The leading ends of the original and copy material meet at the junction point 32, and travel together in the form of the loop defined by roller 28, towards the guide 44 and may be gripped and fed to the copying section of the machine.

When the trailing edge of the original releases the finger 43 of the microswitch 42, the clutch is disengaged and the brake operated to prevent feed of the copy material. This is brought to a standstill but the rollers 20 and 21 rotate continuously and they exercise a tautening action on the braked material. An electrical pulse is transmitted to the solenoid 59 to withdraw the latch 58 against the force of the light spring. The spring 55 can now operate rapidly to lower the knife and raise the rack bar. The rack bar previously holding open the switch 60 now releases it for closure. The motor operating the sector 61 is energised and the sector turns in the clockwise direction, FIG. 2. The action of the cutter is delayed by the delay unit 65 i.e., the pulse to release the latch is not imparted until the copy material has been effectively braked. The rack bar rises to a limited upper extent so that the sector eventually engages the rack of the bar and lowers the bar, thus restoring the raised position of the knife and eventually operating the switch 60 to cut out the motor when the sector has arrived again at its original position, FIG. 2. The length of copy material cut off will be substantially equal to the length of the original.

The original and the copy material are fed together as a loop from the junction point under the roll 28 and upwards to the belts 3 and 38 which carry it through the guide 44 into the copying machine where the grip of the original and the copy material will take place for feed through that machine.

The trip mechanism may comprise means responsive to an air jet or to a beam co-operating with a sensitive cell, e.g., it may comprise an air device nozzle 66, 67 FIG. 7 arranged to produce a jet that can be interrupted by the original or a light beam device 68, 69, see FIG. 8, producing a beam that can be so interrupted.

Reference will now be made to another embodiment illustrated by way of further example in FIG. 9 of the drawings.

The rollers 1 and 2 receive the leading end of the original 3 which is conveyed between the belt conveyor 4 which is associated with tensioning roller 8, the belt conveyor 4 passing over suitable guide rollers 6, 7 to a guide plate 4a which and the belt 5 meet at the nip of common feed rolls 9, 10 and thence by belt conveyors 11 and 5 to the exit point 12 when it can be registered with the inlet to the copying machine. The latter is not illustrated but may be any suitable photographic copying apparatus, e.g., including a copying cylinder, a device for separating the original from the copy and a unit for developing the copy.

The copy material 13 is drawn from a roll by supply rollers 14, 15 and passes over a platform 16 slotted or gapped at 17 or otherwise suitably formed to accommodate a cutting knife 18.

The cutter knife is operated by an electric motor (not shown) or by spring action as aforesaid, and a trip mechanism, e.g., of any suitable pulse-producing type (or as previously described) is associated with the rollers 1, 2 e.g., it may comprise a finger-operated switch as aforesaid at A, at a distance from the common feed rolls 9, 10 equal to the distance of the path of the copying material from the cutting point of the said rolls.

Assuming a copying step has taken place, the motor will have raised the cutter (or the cutter will have been raised as previously described), to the position shown and have been automatically cut-out and have re-set the trip mechanism (or the cutter will have been raised and the spring energised if the cutter device is as has been previously described in relation to the first embodiment).

As stated the path of the original from the trip mechanism to the nip of the common rollers 9, 10 will be equal to the path of the copy material from the cutting point to the nip of the common rollers. It follows that the leading edges of the original and the copying material will register and the cut section will be of the same length as the original and this relation will follow from copy to copy.

The leading edge of the original will energize the trip mechanism, but the cutter motor remains inoperative. When the trailing edge of the original leaves the trip mechanism the latter becomes operative to energize the motor (or release the spring) and the cutter rapidly descends to sever the leading section of the copy material to a length equal to that of the original. The drive of the supply rolls 15, 16 can be stopped at or about the time the cutter is to descend, e.g., by means as described in relation to the first embodiment. As in that embodiment the cutter can be operated by spring means and controlled as aforesaid.

The severed section passing through the nip of the intermediate rollers 19, 20 can be conveyed by belt conveyors 21, 22 under a guide roller 23, forming a loop of the copy material, to the nip of the common rollers 9, 10 and thence it is conveyed with the original to the exit point by means of belt conveyors 5 and 11.

The guide roller 23 is movable in a slot 24 between its full line position shown to the dotted position at 23a.

The actual cutting operation is momentary but if the apparatus is appropriately designed and the draw on the copy material by the intermediate rollers 19, 20 is appropriately adjusted to keep the copy material taut for cutting and the guide roller is appropriately mobile the material between the intermediate rollers and the cutting zone can be held while the loop is somewhat shortened by the continuously travelling operating common feed rollers drawing thereon.

What we claim is:

1. In or for a copying machine for copying an original form onto copy material stored in a supply, feed apparatus comprising:
   means for feeding an original,
   means for feeding copy material from a supply,
   a severing means for cutting off a section of said copy material for delivery with said original, said severing means being operative to cut off a length of said copy material determined by the length of said original,
   trip mechanism operable by said original fed into said apparatus and releasable by said original to cause actuation of said severing means, means responsive to said trip mechanism for stopping said copy material at a severing zone, means for forming a loop of said copy material on the delivery side of said severing means while the leading ends of said original and said copy material are travelling thereby permitting the material loop to be shortened while the material at the cutting zone is stopped, a pair of intermediate rollers arranged on the delivery side of said severing means, and a guide roller on the delivery side of said intermediate rollers to determine the size of said loop, said guide roller being displaceable upwardly and downwardly within a slot by the tension of material in said loop.

2. Feed apparatus according to claim 1, comprising belt-conveying means for continuously feeding the original, feed rollers for feeding the copy material from the supply, a table or platform over which the copy material passes, said platform being designed to permit the severing means to sever the material supported thereon and belt conveyor means for conveying the copy material to a position where the original and severed copy material are brought together, and further belt conveying means for conveying the original and the severed copy material to a copying means.

3. Feed apparatus according to claim 1, comprising means to bring the leading ends of the original and copy material together arranged so that the path of the original from the said trip mechanism to the region where said ends come together is substantially equal to the path for the copy material from the severing means to the said region, and means timing the cut in dependence upon the length of the original.

4. Feed apparatus according to claim 1, in which the trip mechanism is operatable by the leading edge of the original to initiate feed of copy material from the supply.

5. Feed apparatus according to claim 4, comprising switch means and an electric motor, and in which the trip mechanism when operated by the leading end of the original acts on said switch means to couple said electric motor to drive the means for feeding the copy material from the supply.

6. Feed apparatus according to claim 5, comprising a clutch and in which the trip mechanism when operated by the leading edge of the original causes the engagement of said clutch, said clutch being operative to couple the said feed means for the copy material to its driving motor.

7. Feed apparatus according to claim 4, in which the trip mechanism when operated by the leading edge of the original releases a brake to permit operation of the feed mechanism for the copy material.

8. Feed apparatus according to claim 1 in which the trip mechanism when released by the trailing end of the original acts to stop the feed of copy material from the supply.

9. Feed apparatus according to claim 5 in which the trip mechanism is releasable by the trailing end of the original and disengagement of the said clutch is responsive thereto.

10. Feed apparatus according to claim 7, in which the trip mechanism when released by the trailing end of the original, causes the brake to become operative.

11. Feed apparatus according to claim 1, in which severing means comprises a knife and spring means and in which said knife is operable for severing the copy material by said spring means, the spring means being energized and the knife retained in inoperative position until the trip mechanism is released by the trailing end of the original and means responsive thereto whereby the knife is freed for movement by the action of the spring means to sever the copy material.

12. Feed apparatus according to claim 11 comprising a rack bar means whereby the knife is held in inoperative position by a latch or like mechanism retaining said rack bar and releasable when the trip mechanism is released by the trailing end of the original so that the rack bar then releases the knife for displacement by the spring means for severing the material.

13. Feed apparatus according to claim 12, comprising switch means and a solenoid means, said switch means being responsive to the trip means for transmitting a pulse to said solenoid or like means for releasing the said latch when the original releases the trip mechanism.

14. Feed apparatus according to claim 1 comprising means whereby the original and copying material come together after the loop of copying material has been formed.

15. Feed apparatus according to claim 1 comprising means whereby the original and the copy material are brought into juxtaposition and travel together as the loop.

16. Feed apparatus according to claim 1, in which the knife severing means comprise a knife having a scalloped edge forming a series of spaced points and intervening concave cutting edges so that the points first pierce the copy material and the said cutting edges between the said points then progressively cut the material.

17. Feed apparatus according to claim 16 in which the knife has a progressive lateral movement while descending.

18. Feed apparatus according to claim 1 in which the trip mechanism comprises a microswitch and a finger controlling the switch and displaceable by the leading edge of the original.

19. Feed apparatus according to claim 1, comprising two endless belts for conveying the original between adjacent reaches thereof, means including an endless belt for conveying the copy material on the delivery side of the severing means; trip mechanism including a switch operable by a finger which intersects said reaches and intrudes in the path of the original between them and is arranged to be displaced by the leading end of the original to set in motion the feed from the supply of the copy material; the finger when released by the trailing end of the original initiating stopping the copy material and initiating the displacement of the severing means for the cut.

20. Feed apparatus according to claim 1 in which the trip mechanism comprises a beam producing means operative in response to the interruption of the beam by the original.

21. Feed apparatus according to claim 1 in which the trip mechanism comprises an air jet producing means operative in response to the interruption of the jet by the original.

22. In or for a copy machine, feed apparatus comprising:

means for feeding an original, means for feeding copy material from a supply, severing means for cutting off a section of said copy material for delivery with said original, said severing means being operative to cut off a length of said copy material determined by the length of said original, trip mechanism operable by said original fed into said apparatus and releasable by said original to cause actuation of said severing means, said severing means comprising a knife and spring means wherein said knife is moved for severing the copying material by said spring means, said spring means being energized and said knife being retained in an inoperative position until said trip mechanism is released by the trailing end of said original, means responsive to said trailing end for freeing said knife for movement by the action of said spring means to sever said copy material, a rack bar means for holding said knife in an inoperative position by a latch or like mechanism retaining said rack bar and releasable when said trip mechanism is released by the trailing end of said original to release said knife for displacement by said spring means, thus severing the material, and a gear sector, wherein said bar controls a switch which in turn controls the drive of said gear sector and wherein said gear sector is idle while said bar is retaining said knife inoperative, but wherein after said bar has been released and permitted said knife to operate, said gear sector is turned to engage said rack and displace said bar in reverse direction to re-energize said spring until said switch is operated to turn off said gear sector drive.

23. In or for a copy machine, feed apparatus comprising:

means for feeding an original, means for feeding copy material from a supply, severing means for cutting off a section of said copy material for delivery with said original, said severing means being operative to cut off a length of said copy material determined by the length of said original, trip mechanism operable by the original fed into said apparatus and releasable by said original to cause actuation of said severing means, two endless belts for conveying said original between adjacent reaches thereof, means including an endless belt for conveying said copy material on the delivery side of said severing means, said trip mechanism including a switch operable by a finger which intersects said reaches and intrudes in the path of the original between them and is arranged to be displaced by the leading end of said original thus setting in motion the feed from the supply of said copy material, said finger, when released by said trailing end of said original, initiating stopping the copy material and initiating the displacement of said severing means for the cut, means for causng said leading end of said original to meet the leading end of said copy material and for subsequently forming a juxtapositioned loop of both the original and copy material, means for allowing said loop to shorten while allowing said copy material in the region of said severing means to be held stationary while the leading ends of said copy material and said original continue to travel on the delivery side of said loop, and opposed endless belts for conveying said original and said copying material from said loop to the copy machine.

References Cited

UNITED STATES PATENTS

| | | | |
|---|---|---|---|
| 2,850,091 | 9/1958 | Carter | 83—209X |
| 3,182,539 | 5/1965 | Williams, Jr. | 83—211X |
| 3,191,475 | 6/1965 | Scott et al. | 83—155 |

FOREIGN PATENTS

| | | |
|---|---|---|
| 89,290 | 1896 | Germany. |

FRANCIS S. HUSAR, Primary Examiner

J. F. COAN, Assistant Examiner

U.S. Cl. X.R.

83—205, 224, 587; 355—13